(12) United States Patent
Cornwall et al.

(10) Patent No.: US 9,175,980 B2
(45) Date of Patent: Nov. 3, 2015

(54) HOME DISPLAY UPDATABLE VIA UTILITY ENDPOINT

(75) Inventors: Mark K. Cornwall, Spokane, WA (US); Barry Cahill-O'Brien, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 587 days.

(21) Appl. No.: 12/889,465

(22) Filed: Sep. 24, 2010

(65) Prior Publication Data

US 2011/0074599 A1    Mar. 31, 2011

Related U.S. Application Data

(60) Provisional application No. 61/246,560, filed on Sep. 29, 2009.

(51) Int. Cl.
*G01D 4/00* (2006.01)

(52) U.S. Cl.
CPC ........ *G01D 4/004* (2013.01); *H04B 2203/5433* (2013.01); *Y02B 70/3266* (2013.01); *Y02B 90/242* (2013.01); *Y04S 20/242* (2013.01); *Y04S 20/322* (2013.01); *Y04S 20/46* (2013.01)

(58) Field of Classification Search
CPC .. G01D 4/002; Y02B 70/3266; Y02B 90/241; Y02B 90/242; Y02B 20/46; H04B 2203/5433; H04Q 2209/10
USPC .................... 340/870.01–870.18; 702/60, 61; 700/22, 90, 275, 286, 291, 295; 705/400, 412
See application file for complete search history.

(56) References Cited

U.S. PATENT DOCUMENTS

| | | | |
|---|---|---|---|
| 5,056,107 A | 10/1991 | Johnson et al. | |
| 6,844,825 B2 * | 1/2005 | Shincovich | 340/870.02 |
| 7,283,580 B2 * | 10/2007 | Cumeralto et al. | 375/137 |
| 7,298,288 B2 | 11/2007 | Nagy et al. | |
| 7,379,791 B2 * | 5/2008 | Tamarkin et al. | 700/286 |
| 7,427,927 B2 * | 9/2008 | Borleske et al. | 340/870.02 |
| 8,103,563 B2 * | 1/2012 | O'Neil | 705/34 |
| 8,150,989 B2 * | 4/2012 | Mostafa | 709/231 |
| 2005/0240314 A1 * | 10/2005 | Martinez | 700/286 |
| 2008/0068215 A1 * | 3/2008 | Stuber et al. | 340/870.02 |
| 2010/0188257 A1 * | 7/2010 | Johnson | 340/870.02 |

* cited by examiner

*Primary Examiner* — Hai Phan
*Assistant Examiner* — Franklin Balseca

(57) ABSTRACT

Disclosed are an in home display apparatus and methodology for displaying utility consumption and other related information to a consumer. The display device monitors transmissions from a utility consumption endpoint on a meter for user readable display. Messages relevant to the consumer may be sent to the endpoint to be relayed along with bubbled-up data from the endpoint on the meter to the in home display device. Flags related to certain of the messages may be set by the endpoint and cleared by the in home display device as a mechanism for acknowledging receipt of messages. Network readers see that set flags have been cleared and thus confirm message delivery to the network.

17 Claims, 3 Drawing Sheets

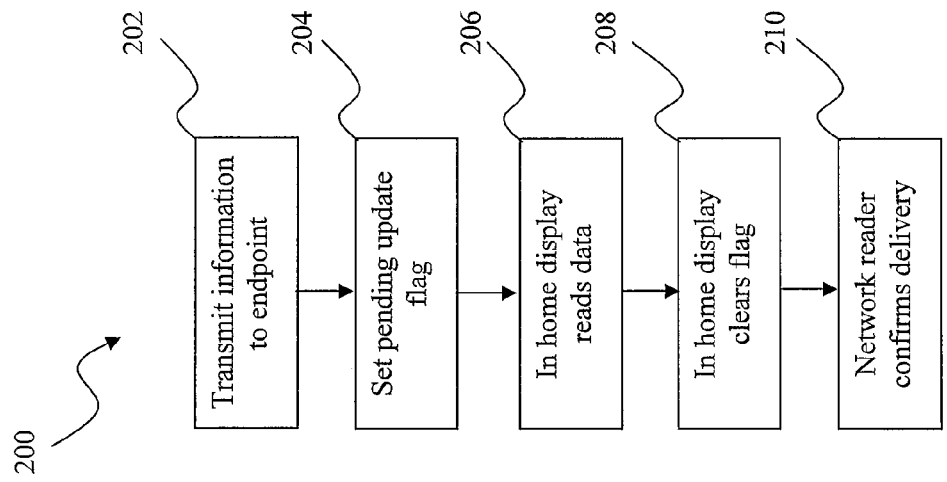
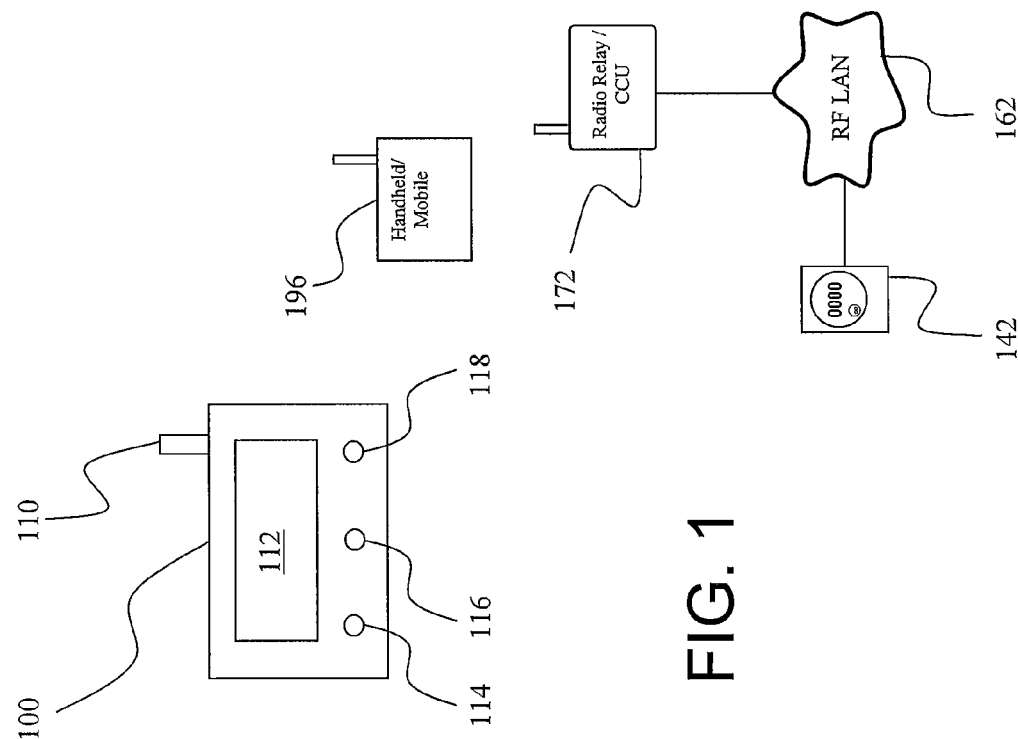

HOME DISPLAY UPDATABLE VIA UTILITY ENDPOINT

PRIORITY CLAIM

This application claims the benefit of previously filed U.S. Provisional Patent Application entitled "IN HOME DISPLAY UPDATABLE VIA UTILITY ENDPOINT," assigned U.S. Ser. No. 61/246,560, filed Sep. 29, 2009, and which is incorporated herein by reference for all purposes.

FIELD OF THE INVENTION

The present subject matter relates to in home display apparatus and methodologies. More particularly, the present subject matter relates to in home display devices and methodologies for displaying utility usage and related information and associated messages.

BACKGROUND OF THE INVENTION

In general, wireless automatic meter reading systems are known. Frequently, each utility meter is provided with a battery-powered encoder that collects meter readings and periodically transmits such readings over a wireless network such as to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. Such types of layered wireless transmission networks allow for the use of lower power, unlicensed wireless transmitters in the many thousands of endpoint encoder transmitters that may be deployed as part of a utility meter reading system for a large metropolitan area.

A challenge faced both by utilities and consumers in attempting to reduce energy consumption (gas and/or electric) as well as water consumption, is the lack of access to real-time data on the part of the actual consumer of the amount of actual energy still being used once the consumer has attempted to conserve energy or preserve (i.e., limit) water consumption. For instance, it would be of value to the consumer to know the immediate economic impact of reduced water or energy consumption (gas and/or electric) once a thermostat is turned down in the winter for a few hours, or once the lights are turned off in the basement when not in use, or to know the specific impact on water conservation by foregoing watering one's lawn for one day.

The provision of In Home Displays (IHD) is becoming more common place in the effort to conserve energy. IHD's typically receive energy usage information via the Internet and display the information so that an end user may see how much electricity, gas, or water they are using. In some cases, the IHD will receive rate information via the internet and usage information directly from the endpoint attached to the meter. Such an approach works adequately for most purposes if the customer has access to the Internet. Other systems eventually provide consumption and other information back to the consumer, but not on command by the consumer and/or not in real-time.

Accordingly, there is a need for a system for collecting and displaying data from metering units located close to the point of use or consumption. An approach that addresses the aforementioned problems, as well as other related problems, is therefore desirable.

The complete disclosures of the herein referenced patent related publication documents are fully incorporated herein for all purposes.

While various implementations of utility metering display systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodologies for displaying utility consumption and other related information to a consumer have been provided.

In an exemplary configuration, a display device is provided for in home use that is configured to provide consumption information to a user from an onsite endpoint device located on (or in association with) the consumption recording meter.

In one of its simpler forms, an in home display device is configured to receive messaging information without the need for an Internet connection (or without the need for a separate such connection).

Another positive aspect of the present type of device is that messaging information beyond normal usage information may be conveyed across the system to the user via the in home display device.

In accordance with aspects of certain embodiments of the present subject matter, methodologies are provided to verify receipt of message information by the in home display device.

In accordance with certain aspects of other embodiments of the present subject matter, methodologies have been developed to make available for consumer messaging a portion of data sent to utility endpoint devices.

In accordance with yet additional aspects of further embodiments of the present subject matter, apparatus and accompanying methodologies have been developed to provide rate information updates to endpoint devices while otherwise also providing messages to users via the in home display device regarding such rate updates.

According to yet still other aspects of additional embodiments of the present subject matter, apparatus and methodologies have been developed to insure that users have received update information, and to ensure that delivery notification is confirmed to the network.

In accordance with yet still further aspects of still further embodiments of the present subject matter, methodologies have been developed to provide update and messaging to endpoint devices by fixed networks as well as by mobile devices.

One present exemplary embodiment in accordance with the present subject matter relates to an in home display apparatus for displaying utility consumption and related messages to a consumer, comprising means for monitoring transmissions of consumption data and related consumer messages from an endpoint of a utility consumption meter associated with a user; and display means for providing a user readable display of consumption data and related consumer messages.

In some alternative embodiments, such messages may include updates to consumers. In other present alternatives, such means for monitoring may include an RF receiver for overhearing transmitted consumption data and consumer messages from an endpoint of an associated meter, for providing real time data to a consumer of the amount of consumption without requiring an internet connection to obtain such data. In yet others, such means for monitoring may include means for checking overheard transmissions for flags, and transmitter means for instructing flags to be cleared, to signal to an associated network confirmation of message delivery to such in home display apparatus.

In yet other present variations of an in home display apparatus, other features may include an associated wireless automatic meter reading system with a plurality of utility meters, each provided with a battery-powered endpoint that collects meter readings and periodically transmits such readings over a wireless network to a central station. In some of the foregoing embodiments, such meters may include at least one of electricity, gas, and water meters.

Yet in other present variations, such consumer messages may comprise rate updates to associated endpoints and to consumers through such display means.

Other present in home display apparatus may optionally further include a mobile device in communication with such wireless network for receiving transmissions of consumption data, and for sending consumer messages for retransmission from such endpoints. Still others may further include user operable control switches associated with such in home display apparatus for controlling operational functionality of such apparatus.

Another present exemplary embodiment in accordance with present subject matter relates to an automatic meter reading system having in home consumer information features. Such system may preferably comprise a plurality of meters, respectively associated with a plurality of endpoints which collect meter readings at an associated meter and periodically transmit such readings wirelessly into a bidirectional network which conducts such collected meter readings to a central station; at least one in home consumer information device, associated onsite with a given endpoint and associated meter, such in home device including an RF transceiver for overhearing transmissions from its associated onsite meter; and message means associated with each of such endpoints and associated meters, for receiving consumer intended messages from a central station via the bidirectional network and including them in transmitted readings, and for flagging transmitted readings that there is a message included therein. Preferably, such an in home device further includes means for transmitting a flag-clear signal to one of the network and its associated meter upon receipt of a flagged transmitted reading thereto, so as to indicate receipt thereby of a consumer intended message from the central station.

Present exemplary variations of such automatic meter reading system may further include a plurality of such in home devices, respectively associated with a plurality of given endpoints and associated meters, each of such in home devices further including display means for providing a consumer readable display of real time meter reading data and related consumer messages. In others, alternatively such consumer intended messages may include rate updates which are received at each of such endpoints and associated meters, for updating such meters, and which are displayed to respective consumers at such plurality of in home devices.

Yet other present alternative automatic meter reading systems may further include input means associated with each of such in home devices, for control of operational inputs thereto by a consumer; and wherein such plurality of meters may comprise at least one of electricity, gas, and water meters. Still other present alternatives may further include a handheld device for receiving transmitted meter readings from at least selected of such plurality of meters, for gathering utility consumption data for billing purposes. In others, such bidirectional network may further include full two-way messaging between such plurality of meters and the central station using a network transparent protocol.

It is to be understood by those of ordinary skill in the art that the present subject matter is intended as equally pertaining to both apparatus and related or associated methodology. One present exemplary method relates to methodology for in home receipt of onsite utility consumption data and consumer messages, comprising providing a bidirectional network having a plurality of meters and endpoints respectively associated therewith, in communication with a collection engine via such network; collecting readings at such meters with such endpoints and periodically transmitting such readings wirelessly into the bidirectional network for conduct thereof to the collection engine; providing at least one in home consumer information device, associated onsite with a given endpoint and associated meter, and using such in home device for monitoring transmissions directly from its associated onsite meter and associated endpoint; receiving consumer intended messages at endpoints and associated meters as sent thereto via the bidirectional network; and including consumer intended messages with transmitted readings, whereby messages may be sent to a consumer via the bidirectional network coupled with real time utility consumption data from the consumer's associated meter.

Alternative present methodologies may further include flagging transmitted readings that there is a message included therein; and transmitting a flag-clear signal from such in home consumer information device to its associated meter and endpoint upon receipt of a flagged transmitted reading thereto, so as to indicate receipt thereby of a consumer intended message. Still other present alternatives may further include providing a consumer readable display of real time meter reading data and related consumer messages as monitored at such in home consumer information device.

Other present alternatives may further include providing a plurality of such in home devices, respectively associated with a plurality of given endpoints and associated meters, each of such in home devices further including a consumer readable display of real time meter reading data and related consumer messages as monitored at such in home consumer information device; and wherein such meters comprise at least one of electricity, gas, or water meters.

Yet other present alternatives may further include providing rate updates to consumers and their associated meters and endpoints via such consumer intended messages; and sending such consumer intended messages to endpoints and their associated meters via one of a partially fixed bidirectional network, a fully wireless bidirectional network, and a mobile device interoperative with a bidirectional network.

Still other present alternative methodologies may further include flagging transmitted readings that there is a message included therein; transmitting a flag-clear signal from such in home consumer information device to its associated meter and endpoint upon receipt of a flagged transmitted reading thereto, so as to indicate receipt thereby of a consumer intended message; and providing a plurality of such in home devices, respectively associated with a plurality of given endpoints and associated meters, each of such in home devices further including a consumer readable display of real time meter reading data and related consumer messages as monitored at such in home consumer information device.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 illustrates a block diagram overview of an in home display device in accordance with the present subject matter and its operational relationship with an exemplary (or representative) Advanced Metering System (AMS);

FIG. 2 is a flow chart representation of operational features of an in home display device in accordance with present technology;

Figure 3:
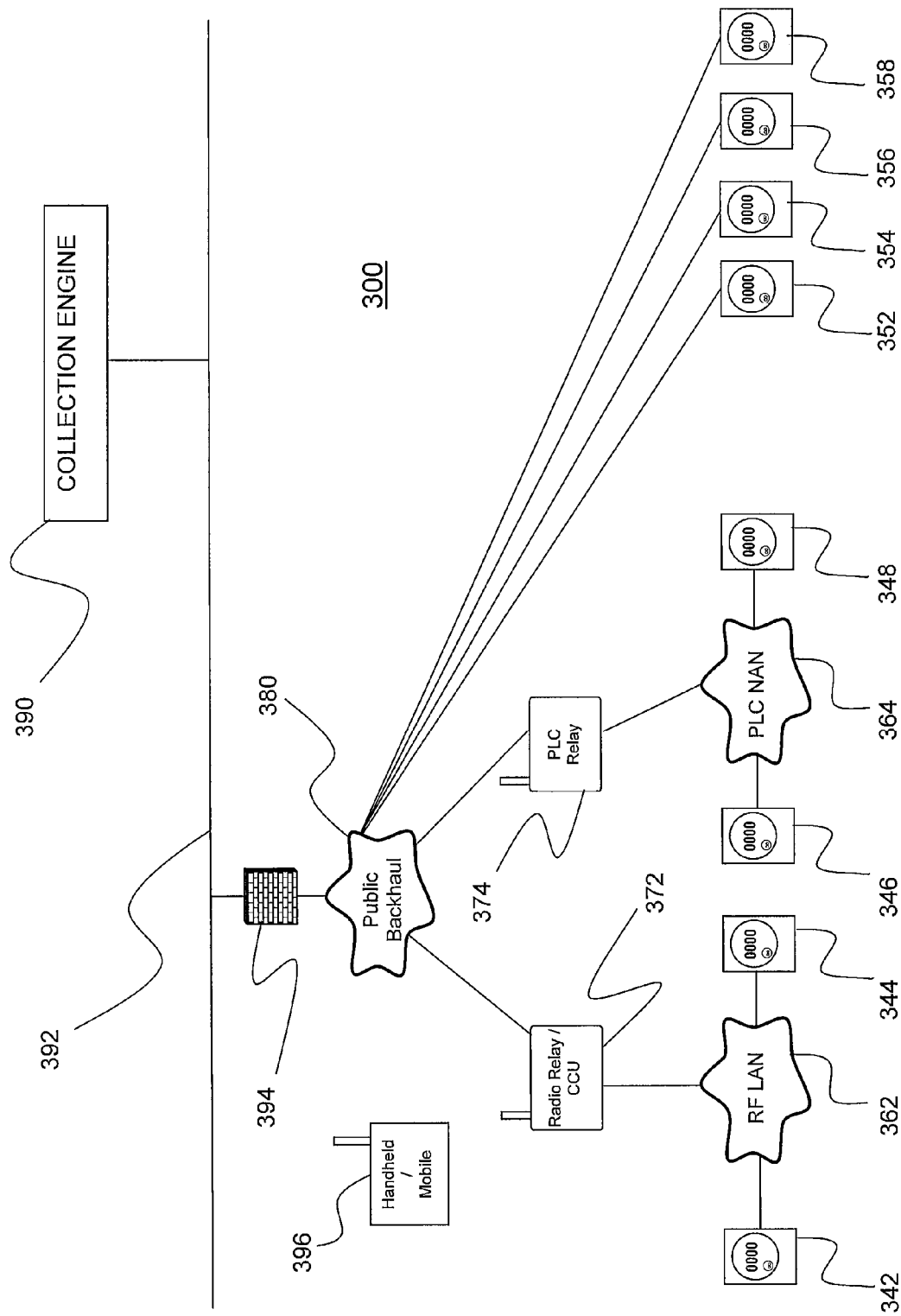
FIG. 3 illustrates a block diagram overview of a representative Advanced Metering System with which an in home display in accordance with the present subject matter may be associated.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with in home display devices and related/corresponding methodologies for displaying utility usage and related information and/or messages.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject in home display. Referring now to the drawings, and including reference at least in part initially to FIG. 3, there is illustrated a block diagram overview of a representative Advanced Metering System with which an in home display in accordance with the present subject matter may be associated.

Advanced Metering System (AMS) generally 300 is representatively illustrated as a comprehensive system for providing advanced metering information and applications to utilities. AMS 300 may be preferably provided around industry standard protocols and transports, and be preferably established to transparently work with standards compliant components from various (i.e., different) providers.

As will be understood by those of ordinary skill in the art, major components of AMS 300 may include representative meters 342, 344, 346, 348, 352, 354, 356, and 358; one or more radio networks including RF local area network (RF LAN) 362 and accompanying Radio Relay 372 that are configured to communicate via RF communications technology to RF responsive meters 342, 344, and power line communications neighborhood area network (PLC NAN) 364 and accompanying PLC Relay 374; an exemplary/representative IP based Public Backhaul generally 380; and a Collection Engine generally 390 connected over a communications linkage generally 392. Radio Relay 372 may correspond to a Cell Control Unit (CCU) in other exemplary configurations where primarily wireless communications are employed. Other components within AMS 300 may include a utility LAN 392 and firewall 394 through which communications signals to and from Collection Engine 390 may be transported from and to meters 342, 344, 346, 348, 352, 354, 356, and 358 or from and to other devices including, but not limited to, Radio Relay/CCU 372 and PLC Relay 374.

AMS 300 is configured to be transportation agnostic or transparent; such that representative meters 342, 344, 346, 348, 352, 354, 356, and 358 may be interrogated using Collection Engine 390 regardless of what network infrastructure exists in between. Moreover, due to such transparency, such meters may also respond to Collection Engine 390 in the same or similar manner.

As illustrated in FIG. 3, Collection Engine 390 is capable of integrating data from and/to Radio, PLC, and/or IP connected meters. To facilitate such transparency, AMS 300 preferably may use ANSI C12.22 meter communication protocol for networks. C12.22 is a network transparent protocol, which allows communications across disparate and asymmetrical network substrates. C12.22 details all aspects of communications, allowing C12.22 compliant meters produced by third parties to be integrated into a single advanced metering interface (AMI) solution. AMS 300 is configured to provide meter reading as well as load control/demand response, in home messaging, and outage and restoration capabilities. As will be understood by those of ordinary skill in the art, all data flowing across the system may be sent in the form of C12.19 tables. The system provides full two-way messaging to every device; however, many of its functions may be provided through broadcast or multicast messaging and session-less communications.

With reference now to present FIG. 1, there is illustrated a block diagram overview of an in home display device generally 100 in accordance with the present subject matter and its operational relationship with an exemplary Advanced Metering System (AMS). As may be seen from FIG. 1, portions of the previously described AMS 300 have been illustrated as previously described Radio Relay or alternatively Cell Control Unit (CCU) 172, RF LAN 162, and meter 142 corresponding to items 372, 362, and 342, respectively, of FIG. 3.

In Home Display (IHD) generally 100, in accordance with the present subject matter, is configured to receive messages bubbled up by a utility endpoint on the meter, representatively illustrated herein as meter 142. As described in U.S. Pat. No. 7,298,288 B2, assigned to the owner of the present technology (and the complete disclosure of which is incorporated herein by reference for all purposes), battery-powered endpoints have been designed to limit the power consumed in day-to-day operation. One known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes. One advantage of using a bubble up operation in battery powered meters is prolonged battery life in the range of twenty years on a single battery.

As the endpoint on meter 142 bubbles-up its collected data, IHD 100 can pick up the data directly for display to the user without having to rely on such data being returned to IHD 100 via the AMR network collection engine, other readers, or the Internet. One benefit of IHD 100 receiving information in such manner per the present subject matter is that rate information and messaging may be sent to the endpoint on the meter for later delivery to IHD 100 without compromising battery life in the endpoint. As a beneficial consequence of such an arrangement, the transmission and reception capabilities of IHD 100 need not necessarily be as robust as that of the endpoint on meter 142 due to the relatively short transmission distances involved. Further, communications between IHD 100 and the endpoint on representative meter 142 may, in certain embodiments, be configured to occur at times so as to insure minimal disruption of network communications with meter 142 or other possible close proximity display devices and/or endpoints.

As further represented in present FIG. 1, a handheld or mobile device generally 196 may also be provided and may be employed as part of a monthly meter reading cycle and/or for other uses. Handheld or mobile device 196 may be preferably configured to communicate by radio frequency (RF) technology with one or both of Radio Relay/CCU 172 and/or RF responsive meter 142, as will be understood by those of ordinary skill in the art without further detailed discussion. Such communications between handheld or mobile device 196 and Radio Relay/CCU 172 and/or meter 142 may include, but are not limited to, the transmission to and reception from Radio Relay/CCU 172 and/or meter 142 of user utility consumption data as well as other utility related data and messages, as will be described further herein.

With further reference to present FIG. 1, it will be seen that IHD 100 may generally correspond to a device having a display 112 on which may be displayed user readable information including, but not limited to, utility consumption information and message information directed to the user from such as the utility supplier. In other words, such display 112 and associated features may be thought of as comprising display means for providing a user readable display of consumption data and related consumer messages. As presently illustrated, IHD 100 is configured to transmit and receive data and other information by way of an incorporated RF transmitter/receiver as represented by antenna generally 110. Thus, regarding the receiver aspects thereof, in other terms, such features may be regarded as comprising means for monitoring transmissions of consumption data and related consumer messages from an endpoint of a utility consumption meter associated with a user. Further, such means for monitoring may in some embodiments preferably include an RF receiver for overhearing transmitted consumption data and consumer messages from an endpoint of an associated meter, for providing real time data to a consumer of the amount of consumption without requiring an internet connection to obtain such data. It should be appreciated, however, that other methods may be employed to transfer data to and from IHD 100 including, but not limited to, hard wired connections to the endpoint on a meter.

Further, in other present embodiments, such means for monitoring may preferably include means for checking overheard transmissions for flags, and transmitter means for instructing flags to be cleared, to signal to an associated network confirmation of message delivery to said in home display apparatus. In other present embodiments, such transmitter means may be understood as being means for transmitting a flag-clear signal to one of the network and its associated meter upon receipt of a flagged transmitted reading thereto, so as to indicate receipt thereby of a consumer intended message from a central station.

Further, IHD 100 may also be provided with a number of user operable control devices or switches generally 114, 116, and 118, which may be preferably configured to select or control selected operational aspects of IHD 100. Thought of in other terms, such functionality may be perceived as comprising input means associated with each of the IHD's, for control of operational inputs thereto by a consumer Such operational aspects may include, without limitation, such as an on/off function and/or a menu selection function.

With reference now to present FIG. 2, there is illustrated a flow chart generally 200 representing operational features of an in home display device in accordance with present technology. As previously mentioned, updates to endpoint devices representatively illustrated herein as meter 142 (FIG. 1), may be sent to meter 142 either by the AMR network generally 300 (FIG. 3) or by a handheld or mobile device generally 196 (FIG. 1). In operation, a selected number of bytes, for example, 32 bytes in an exemplary configuration, may be made available for passing information/messages to IHD 100. Such bytes may represent, such as, without limitation, rates, take effect dates, messages, and other data and user information. The transmission of such bytes is representatively illustrated at step 202 of flow chart 200.

At step 204, and in the instance that selected data is being sent to the endpoint including, without limitation, data that the sender wishes acknowledged, one or more pending update flags are set by the endpoint. Stated in other terms, such aspects of steps 202 and 204, and related functionality may be understood as comprising message means associated with each of the endpoints and associated meters, for receiving consumer intended messages from a central station via the bidirectional network and including them in transmitted readings, and for flagging transmitted readings that there is a message included therein. Thus, as consumption messages are bubbled-up by the endpoint on meter 142, one or more flags are included to indicate the status of IHD 100 message delivery. The consumption messages bubbled-up are monitored by both IHD 100 and data collection readers such as collection engine 390 (FIG. 3) and handheld or mobile device 196, 396.

As illustrated in step 206 of flow chart 200, IHD 100 reads the bubbled-up data which may include one or more information flags, and, as noted at step 208, clears such flags. Subsequently the reader, i.e., either the network or handheld/ mobile, sees that the flag has been cleared which confirms delivery (step 210) of the flagged update and/or message. In such manner and method, if there is a change of state in any flag, either end, i.e., the in home display device or data collection reader, will act accordingly.

It will be understood by those of ordinary skill in the art that meter 342 of FIG. 3 has been representatively selected to serve as meter 142 of FIG. 1, and that other meters of such FIG. 3 may so serve with the present subject matter. Likewise, it is to be understood that meter 142 of present FIG. 1 is merely representative of various meters, such as electricity, gas, or water meters, which may be practiced in accordance with the present subject matter.

Figure 4:
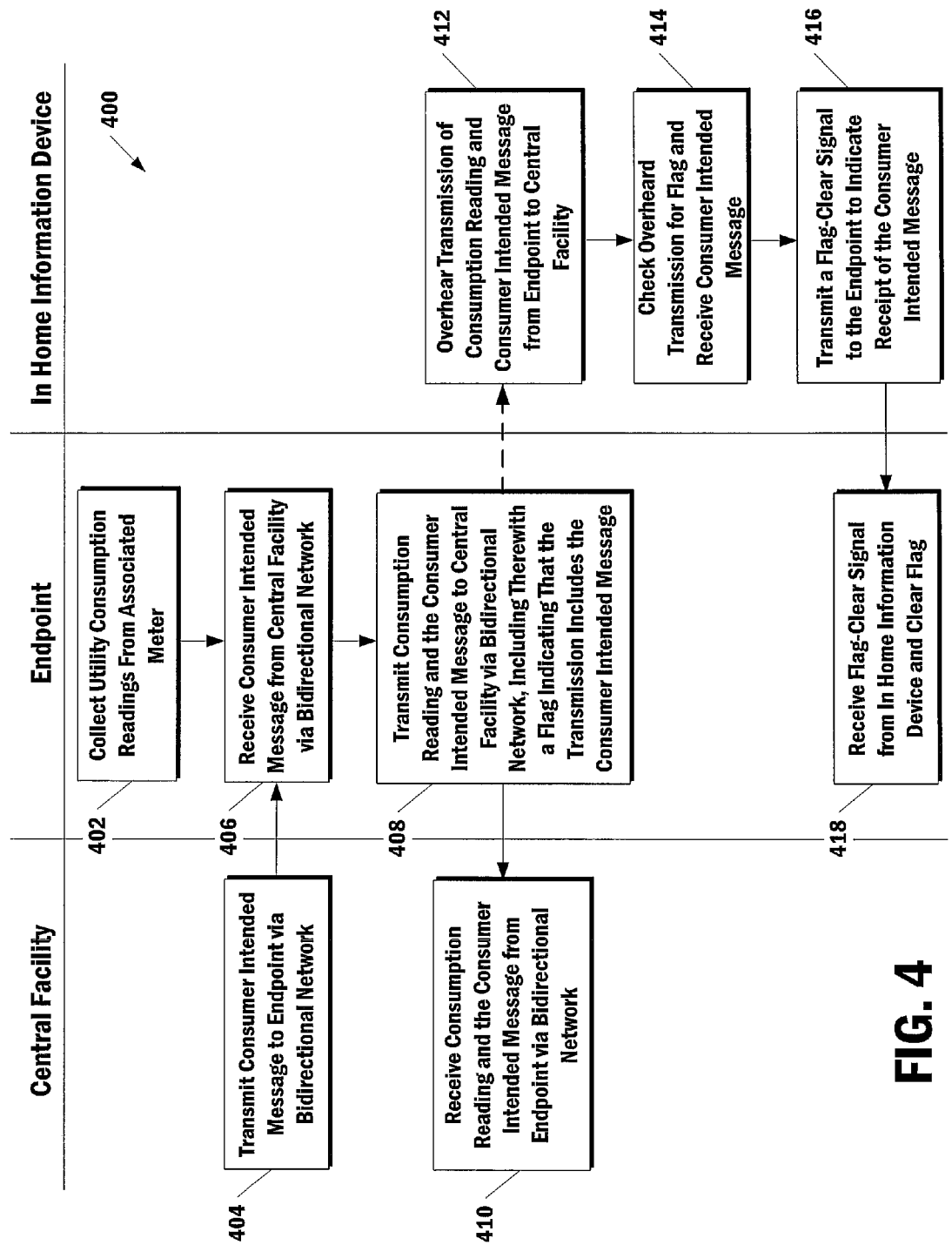
FIG. 4 depicts a flow chart of an exemplary method for in home receipt of onsite utility consumption data and consumer messages according to an exemplary embodiment of the present disclosure.

FIG. 4 depicts a flowchart of an exemplary method (400) for in home receipt of onsite utility consumption data and consumer messages according to an exemplary embodiment of the present disclosure.

At (402) an endpoint can collect utility consumption readings from an associated meter.

At (404) a central facility can transmit a consumer intended message to the endpoint via a bidirectional network. The consumer intended message can include rate updates, take effect dates, messages, and other data and user information.

At (406) the endpoint can receive the consumer intended message from the central facility via the bidirectional network.

At (408) the endpoint can transmit a consumption reading and the consumer intended message to the central facility via the bidirectional network. Such transmission can include a flag that indicates that such transmission includes the consumer intended message.

At (410) the central facility can receive the consumption reading and the consumer intended message from the endpoint via the bidirectional network.

At (412) an in home information device can overhear the transmission of the consumption reading and the consumer intended message from the endpoint to the central facility.

At (414) the in home information device can check the overheard transmission for the flag. The in home information device can detect the presence of the flag and extract or otherwise receive the consumer intended message.

At (416) the in home information device can transmit a flag-clear signal to the endpoint to indicate receipt of the consumer intended message.

At (418) the endpoint can receive the flag-clear signal from the in home information device and can clear the flag from its system.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An in home display apparatus for displaying utility consumption and related messages to a consumer, comprising:
    means for monitoring transmissions of consumption data with flags indicating available related consumer messages from a battery powered endpoint of a utility consumption meter associated with a user to a central utility facility, the related consumer messages having been previously received by the endpoint from the central utility facility;
    transmitter means for transmitting a flag-clear signal to the endpoint of the associated utility consumption meter upon receipt of a later transmitted consumer message, so as to indicate receipt at said in home display apparatus of a consumer message from the central utility facility; and
    display means for providing a user readable display of consumption data and related consumer messages.

2. An in home display apparatus as in claim 1, wherein said messages include updates to consumers.

3. An in home display apparatus as in claim 1, wherein said means for monitoring include an RF receiver for overhearing the transmitted consumption data and consumer messages from the endpoint of the associated utility consumption meter, for providing real time data to a consumer of the amount of consumption without requiring an internet connection to obtain such data.

4. An in home display apparatus as in claim 1, further including:
    an associated wireless automatic meter reading system with a plurality of utility meters, each provided with a battery-powered endpoint that collects meter readings and periodically transmits such readings over a wireless network to a central station; and
    wherein such meters include at least one of electricity, gas, and water meters.

5. An in home display apparatus as in claim 4, wherein said consumer messages comprise rate updates to associated endpoints and to consumers through said display means.

6. An in home display apparatus as in claim 4, further including a mobile device in communication with said wireless network for receiving transmissions of consumption data, and for sending consumer messages for retransmission from said endpoints.

7. An in home display apparatus as in claim 1, further including user operable control switches associated with such in home display apparatus for controlling operational functionality of such apparatus.

8. An automatic meter reading system having in home consumer information features, comprising:
    a plurality of meters, respectively associated with a plurality of battery powered endpoints which collect meter readings at an associated meter and periodically transmit such readings wirelessly into a bidirectional network which conducts such collected meter readings to a central station;
    at least one in home consumer information device, associated onsite with a given endpoint and associated meter, said in home device including an RF transceiver for overhearing transmissions from its associated onsite meter; and
    message means associated with each of said endpoints and associated meters, for receiving consumer intended messages from a central station via the bidirectional network and for flagging transmitted readings that there is a consumer intended message available;
    wherein said in home device further includes means for transmitting a flag-clear signal to one of the network and its associated meter upon receipt of a later transmitted consumer intended message thereat, so as to indicate receipt at said in home device of a consumer intended message from the central station.

9. An automatic meter reading system as in claim 8, further including a plurality of said in home devices, respectively associated with a plurality of given endpoints and associated meters, each of said in home devices further including display means for providing a consumer readable display of real time meter reading data and related consumer messages.

10. An automatic meter reading system as in claim 9, wherein said consumer intended messages include rate updates which are received at each of said endpoints and associated meters, for updating such meters, and which are displayed to respective consumers at said plurality of in home devices.

11. An automatic meter reading system as in claim 9, further including:
    input means associated with each of said in home devices, for control of operational inputs thereto by a consumer; and
    wherein said plurality of meters comprise at least one of electricity, gas, and water meters.

12. An automatic meter reading system as in claim 8, further including a handheld device for receiving transmitted meter readings from at least selected of said plurality of meters, for gathering utility consumption data for billing purposes.

13. An automatic meter reading system as in claim 8, wherein said bidirectional network further includes full two-way messaging between said plurality of meters and the central station using a network transparent protocol.

14. Methodology for in home receipt of onsite utility consumption data and consumer messages, comprising:
    providing a bidirectional network having a plurality of meters and battery operated endpoints respectively associated therewith, in communication with a collection engine via such network;
    collecting readings at such meters with such endpoints and periodically transmitting such readings wirelessly into the bidirectional network for conduct thereof to the collection engine;
    providing at least one in home consumer information device, associated onsite with a given endpoint and associated meter, and using such in home device for monitoring transmissions directly from its associated onsite meter and associated endpoint;
    receiving consumer intended messages at endpoints and associated meters as sent thereto via the bidirectional network;
    including with transmitted readings sent to the collection engine via the bidirectional network flags indicating that received consumer intended messages are available; and
    transmitting a flag-clear signal from such in home consumer information device to its associated meter and endpoint upon receipt of a consumer intended message later transmitted thereto, whereby messages may be sent to a consumer via the bidirectional network coupled with real time utility consumption data from the consumer's associated meter with delivery of such messages confirmed by the cleared flag.

15. Methodology as in claim 14, further including providing a consumer readable display of real time meter reading data and related consumer messages as received at such in home consumer information device.

16. Methodology as in claim 14, further including:
    providing a plurality of such in home devices, respectively associated with a plurality of given endpoints and associated meters, each of said in home devices further including a consumer readable display of real time meter reading data and related consumer messages as received at such in home consumer information device; and
    wherein such meters comprise at least one of electricity, gas, or water meters.

17. Methodology as in claim 14, further including:
    providing rate updates to consumers and their associated meters and endpoints via such consumer intended messages; and
    sending such consumer intended messages to endpoints and their associated meters via one of a partially fixed bidirectional network, a fully wireless bidirectional network, and a mobile device interoperative with a bidirectional network.

* * * * *